No. 897,298. PATENTED SEPT. 1, 1908.
A. MEIS.
MANUFACTURE OF SCYTHES.
APPLICATION FILED MAR. 3, 1908.
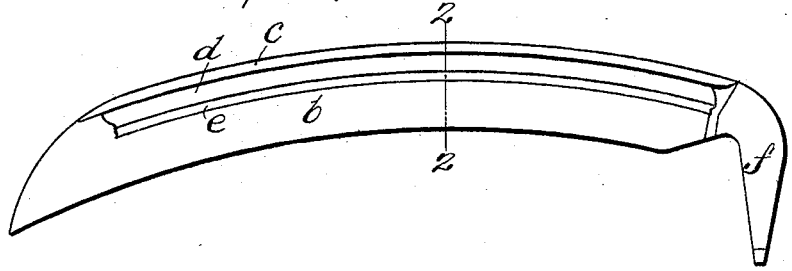
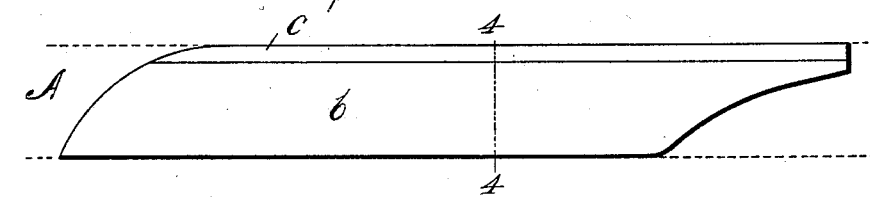
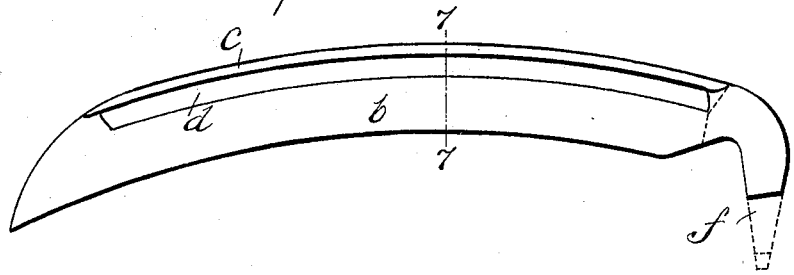
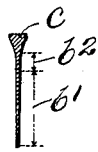
Alfred Meis
Inventor
Witnesses
By
Attorney

UNITED STATES PATENT OFFICE.

ALFRED MEIS, OF READING, PENNSYLVANIA, ASSIGNOR TO COLUMBIAN CUTLERY COMPANY, OF READING, PENNSYLVANIA, A CORPORATION OF PENNSYLVANIA.

MANUFACTURE OF SCYTHES.

No. 897,298.  Specification of Letters Patent.  Patented Sept. 1, 1908.

Application filed March 3, 1908. Serial No. 418,938.

*To all whom it may concern:*

Be it known that I, ALFRED MEIS, a citizen of the United States, and a resident of the city of Reading, in the county of Berks and State of Pennsylvania, have invented certain new and useful Improvements in the Manufacture of Scythes, of which the following is a specification.

My invention relates to the manufacture of scythes or similar blade tools, and my object is to provide for the satisfactory production of such blades wholly of hard steel.

The well-proven liability to distortion in shape, and to edge-metal defectiveness, incident to the attempted employment of hard-steel alone in the manufacture of scythe blades, has led to the adoption, and general use up to the present time, of a composite material instead; that is, of a combination of hard-steel such as is required for the cutting edge, with soft steel or iron for the body and back portion. It has been found that this combined softer metal permits the composite blank to be subjected to the severe working action necessary to the required cross-sectional shaping and longitudinal curving of the finished blade, without incurring the liability to distortion and defect before mentioned, the body of soft metal, which of course is unaffected by the hardening process to which the fully shaped blade is subjected, obviously serving to prevent or neutralize the distorting and rupturing strains naturally produced by tempering of wholly hard-steel blades after their subjection to similar working.

The object of my invention is to provide for eliminating or neutralizing the stress thus produced without resorting to the employment of a composite material; that is while employing blade blanks wholly of hard steel. To attain this end I have found it necessary first to eliminate the radically unequal molecular disturbance of high-carbon steel which occurs when the web is produced by the ordinary beating-down of the blank to the required shape; and second, to so confine such necessary working to an intermediate portion of the width of the blank, as to secure both the required longitudinal curvature and transverse set of the blade, while at the same time utilizing the practically undisturbed metal in the thicker back-edge and in the front-web portions of the blank as staying material against the distorting strains incident to the subsequent tempering, in much the same manner as is the soft iron or steel employed in the usual composite blank.

Having thus explained the principle involved in my improved process of manufacture I will more fully describe the practical carrying out of the same in connection with the accompanying drawings.

Figure 1 is a plan view showing a scythe blade of ordinary form to the making of which my improved process is applicable as described; Fig. 2 being a cross-sectional view of the same on the line 2—2. Fig. 3 is a plan view of a rolled blank of high-carbon steel employed in my improved process, the dotted lines indicating the rolled bar from which the blank is cut; Fig. 4 is a cross-sectional view of the same. Fig. 5 is a view similar to Fig. 1, showing longitudinal curvature as desired imparted to the blank by swaging action upon the web portion adjacent to the back-edge, and indicating in dotted lines the applied shank; Fig. 6 is a cross-section of the blank indicating the swaged and unswaged web portions. Fig. 7 is a cross-section showing the usual transverse set imparted to the blade adjacent the back.

It will be seen that the rolled blank A comprises a slightly tapered web $b$ having a thickened or headed back-edge $c$; and that the metal in said headed back-edge $c$, together with that in the forward portion of the web $b$ (indicated at $b'$ Figs. 5 and 6) is subjected to no working in imparting finished shape to the blank, but is left substantially in the same shape and molecular condition in which it left the rolls. The only action to which this metal is subjected occurs indirectly through the swaging operation upon the intermediate web portion adjacent the thickened back-edge $c$; this progressive swaging lengthwise of the blank, upon the web portion $b^2$, exerting a moderate and uniform stretching action upon the nearer metal in the back-edge $c$ in excess of that upon the extended web $b'$, sufficient to produce a convex-curvature of the back edge $c$ and a corresponding concave curvature of the front edge of the web, proportionate to the amount of such swaging at different portions of the length as determined by the varying curvature desired. In imparting the usual transverse set to the blade, as indicated at $d$, and the additional bead-set $e$ if desired, the swaging action is exerted only upon the web portion $b^2$. After the blade has been thus finally shaped without any working of the rolled back-edge or the main web metal including the subsequently ground cutting-edge, I have found that the blade may be tempered, in practice by immersing the whole blade at proper temperature in a suitable tempering bath, without producing any distorting or injurious effect, the unworked back metal $c$ and web metal $b'$ serving to maintain the blade in the form imparted to it before tempering. It will be obvious that a considerable saving in labor is thus effected as compared with the method of combining soft steel or iron with the hard steel essential to a proper cutting edge, while at the same time the desired effect of such combination is attained. Also that a desirable saving of weight may be effected in the finished article, and that a uniformity of cross-sectional form otherwise practically unattainable, is insured by the maintenance of the sectional form and molecular structure imparted to the blank by the rolling operation in all parts excepting a small portion of the web.

The application of the separately formed tang or shank $f$ to the shank end of the blank is preferably effected by welding prior to the swaging operations, but this and other minor operations may obviously be varied without departing from my invention.

What I claim is:—

The improvement in manufacturing scythe blades or the like which consists in rolling a straight high-carbon steel bar of a cross-section comprising a thin web and a headed back-edge as required in the finished blade, and imparting desired longitudinal curvature and transverse set to the blank cut from said bar by swaging action upon a web portion thereof adjacent the headed back-edge without working of the back-edge or front-web portions of the rolled blank, substantially as set forth.

In testimony whereof, I affix my signature, in the presence of two witnesses.

ALFRED MEIS.

Witnesses:
  P. A. BUSHONG,
  OSCAR WANNER.